(12) United States Patent
Peckham et al.

(10) Patent No.: US 11,161,767 B2
(45) Date of Patent: Nov. 2, 2021

(54) VISCOCITY-REDUCING DOPANTS IN OPTICAL FIBERS

(71) Applicant: OFS Fitel, LLC, Norcross, GA (US)

(72) Inventors: David W. Peckham, Lawrenceville, GA (US); Patrick W. Wisk, Greenbrook, NJ (US); Man F. Yan, Berkeley Heights, NJ (US)

(73) Assignee: OFS FITEL, LLC, Norcross, GA (US)

( * ) Notice: Subject to any disclaimer, the term of this patent is extended or adjusted under 35 U.S.C. 154(b) by 300 days.

(21) Appl. No.: 16/241,329

(22) Filed: Jan. 7, 2019

(65) Prior Publication Data

US 2020/0024176 A1 Jan. 23, 2020

Related U.S. Application Data

(60) Provisional application No. 62/621,777, filed on Jan. 25, 2018.

(51) Int. Cl.
*C03B 37/014* (2006.01)
*C03B 37/012* (2006.01)
*C03B 37/027* (2006.01)

(52) U.S. Cl.
CPC .. *C03B 37/01446* (2013.01); *C03B 37/01211* (2013.01); *C03B 37/01473* (2013.01); *C03B 37/027* (2013.01); *C03B 2201/20* (2013.01); *C03B 2201/50* (2013.01); *C03B 2203/22* (2013.01); *C03B 2205/45* (2013.01)

(58) Field of Classification Search
None
See application file for complete search history.

(56) References Cited

U.S. PATENT DOCUMENTS

| | | | | |
|---|---|---|---|---|
| 8,844,323 B2* | 9/2014 | Kitamura | ......... | C03B 37/01807 65/417 |
| 2002/0108403 A1* | 8/2002 | Dong | ............... | C03B 37/01254 65/384 |
| 2013/0336343 A1* | 12/2013 | Miyabe | .............. | H01S 3/06716 372/6 |
| 2016/0185649 A1* | 6/2016 | Gonnet | ................ | C03B 37/018 428/389 |
| 2018/0362392 A1* | 12/2018 | Sakuma | ........... | C03B 37/01225 |
| 2019/0016630 A1* | 1/2019 | Morita | .................. | C03C 13/046 |

FOREIGN PATENT DOCUMENTS

WO    WO-2009034413 A1 *   3/2009   ....... C03B 37/01291

* cited by examiner

*Primary Examiner* — Lisa L Herring
(74) *Attorney, Agent, or Firm* — Sam S. Han, Esq.

(57) ABSTRACT

An optical preform manufacturing process is disclosed in which an alkali dopant is deposited between an optical fiber core rod and an optical fiber cladding jacket. Depositing the alkali dopant between the core rod and the cladding jacket permits diffusion of the alkali dopants into the core during fiber draw when the core and the cladding are at their respective transition (or vitrification) temperatures. Introduction of the alkali dopants between the core rod and the cladding jacket also permits decoupling of the alkali doping process from one or more of other optical preform manufacturing processes. The optical preform manufacturing process can also include placing alkali dopants between an optical fiber inner cladding jacket and an optical fiber outer cladding jacket to reduce the glass viscosity during fiber draw.

6 Claims, 11 Drawing Sheets

VISCOCITY-REDUCING DOPANTS IN OPTICAL FIBERS

CROSS REFERENCE TO RELATED APPLICATIONS

This application claims the benefit of U.S. provisional patent application Ser. No. 62/621,777, filed 2018 Jan. 25, having the title "Optical Fiber Made by Alkali-Doping Originated Near the Core Outer Diameter," which is incorporated herein by reference in its entirety.

BACKGROUND

Field of the Disclosure

The present disclosure relates generally to optical fibers and, more particularly, to alkali-doped optical fibers.

Description of Related Art

Many different factors affect signal attenuation in an optical fiber. Because attenuation affects the signal to noise ratio or quality of data transmission and the distance over which data can be transmitted, manufacturing processes continually strive to maintain acceptable attenuation levels while improving manufacturing efficiency.

SUMMARY

The present disclosure provides for an optical preform manufacturing process in which an alkali dopant is deposited between an optical fiber core rod and an optical fiber cladding jacket. Depositing the alkali dopant between the core rod and the cladding jacket permits diffusion of the alkali dopants into the core during fiber draw when the core and the cladding are at their respective transition (or vitrification) temperatures. Introduction of the alkali dopants between the core rod and the cladding jacket also permits decoupling of the alkali doping process from one or more of other optical preform manufacturing processes. For some embodiments, the optical preform manufacturing process also includes placing alkali dopants between an optical fiber inner cladding jacket and an optical fiber outer cladding jacket to reduce the glass viscosity during fiber draw.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
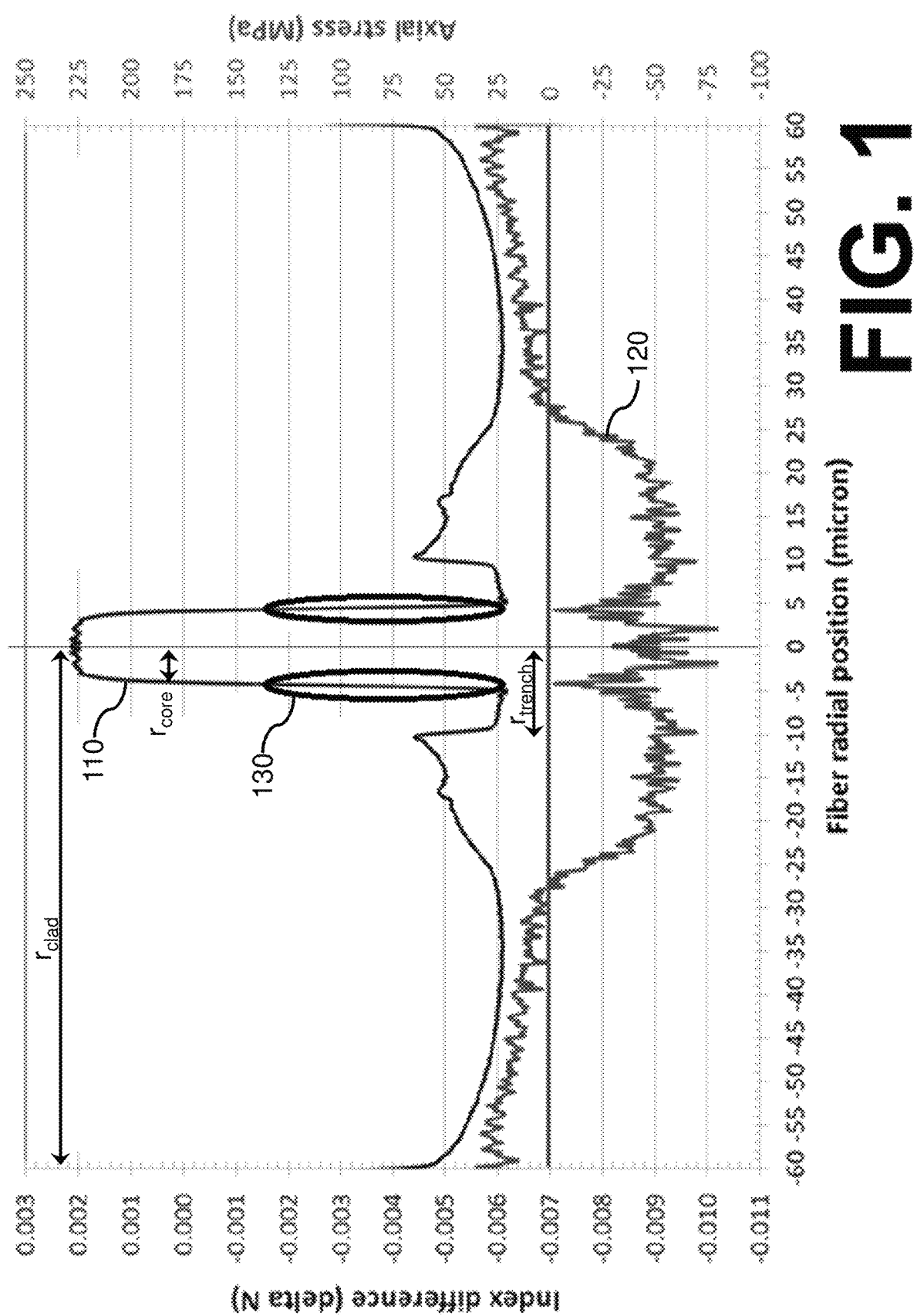
FIG. 1 is a chart showing one embodiment of an alkali-doped fiber profile with a corresponding fiber axial stress profile for the alkali-doped fiber.

When an appropriate concentration of a viscosity-reducing dopant is introduced throughout the entire light-propagating region (e.g., core) of an optical fiber, faster fiber draw speeds are possible without incurring significant losses. The viscosity-reducing dopants also reduce draw-induced index changes, thereby improving uniformity in fiber cutoff wavelengths. Although chlorine (Cl) can be doped in silica simultaneously during glass processing by vapor deposition, alkali dopants (e.g., dopants having lithium (Li), sodium (Na), potassium (K), rubidium (Rb), cesium (Cs), and francium (Fr)) are typically deposited inside a prepared silica tube that is subsequently collapsed into a solid core rod. In other words, viscosity-reducing alkali dopants are conventionally introduced into the rod center throughout the core rod length prior to fiber draw. One example of an ultra-low-loss silica-based optical fiber with a viscosity-reducing dopant in the light propagating regions is shown in U.S. Patent Publication Number 20170022094. These types of processes are both complex and expensive because of the costs and expenses associated with internally doping core rods.

Some of these issues can be mitigated by decoupling the alkali-doping process from the Cl-doping process (or other preform manufacturing processes). As shown herein, several embodiments of the invention provide optical preform manufacturing processes in which an alkali dopant is deposited between a core rod and a cladding jacket prior to fiber draw. As is known, when an optical fiber is drawn from an optical preform, a necking effect occurs in which the diameter of glass decreases significantly as the glass moves through a furnace hot zone. Additionally, as the core rod reaches its transition temperature (or vitrification temperature), the softening of the core rod permits diffusion in the core region. The disclosed embodiments exploit both the diffusion characteristics of the core region and the reduced diameter of the core region in the length (L) of the draw neck-down hot zone.

Specifically, depositing the alkali dopant between the core rod and the cladding jacket permits the alkali dopants to diffuse into or throughout the core during fiber draw when the core and the cladding are at their respective transition (or vitrification) temperatures. Because a diffusion distance reduces proportionally to the reduction in core rod diameter during draw, the alkali dopant can be deposited near the outer diameter of the core rod (instead of throughout the inside of the core rod). From this location (between the core and the cladding), the alkali dopant diffuses throughout the core because of the reduced diffusion distance.

Preferably, the optical fiber is drawn from an alkali-doped optical preform at a draw speed (V) that is greater than three (3) meters-per-second (m/s), which produces an optical fiber with one or more of an alkali dopant, halogen dopant, phosphorous dopant, or other viscosity-reducing dopant. Introducing alkali dopants between the core rod and the cladding jacket also permits decoupling of the alkali doping process from one or more of other optical preform manufacturing processes (e.g., Cl-doping). This decoupling allows for independent examination of the Cl-doped core rod (for Cl-dopant concentration and Cl-induced index) prior to doping with the alkali dopant. For some embodiments, the resulting optical fiber has an attenuation of below 0.18 decibels-per-kilometer (dB/km) at an operating wavelength ($\lambda$) of 1550 nanometers (nm).

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a chart showing one embodiment of a fiber profile 110 and a corresponding fiber stress profile 120 for an alkali-doped fiber. In the embodiment of FIG. 1, the alkali-doped optical fiber has a core radius ($r_{core}$) of approximately 4.5 micrometers (μm), a cladding outer radius ($r_{clad}$) of approximately 62.5 μm. However, it should be appreciated that, for other embodiments, the core radius ranges between approximately 3.5 μm and approximately 12 μm (e.g., 6.5 μm core radius for a larger effective area fiber), while the cladding outer radius ranges from approximately 30 μm to approximately 125 μm. The embodiment of FIG. 1 also comprises a down-doped trench located between the fiber core and the fiber cladding. The trench has an outer trench radius ($r_{trench}$) from approximately 12 μm to approximately 1515 μm.

The alkali-doped fiber of FIG. 1 is manufactured from an optical preform in which an alkali dopant is deposited between an optical fiber core rod and an optical fiber cladding jacket. This can be accomplished by either depositing the alkali dopants on the outer surface of the core rod or on the inner surface of the cladding jacket using known vapor deposition processes. Insofar as such vapor deposition processes (e.g., modified chemical vapor deposition (MCVD)) are known in the art, only a truncated discussions of deposition processes are provided herein.

Depending on the desired fiber profile, the core rod radius ranges from approximately 3 millimeters (mm) to approximately 20 mm, with the alkali dopant being deposited on the surface of the core rod at a thickness of between approximately 0.1 mm to approximately 1.2 mm. Preferably, the optical preform comprises a 4 mm-radius core rod with an alkali dopant layer on the surface of the core rod being approximately 0.25 mm in thickness. Thus, as illustrated in FIG. 1, prior to drawing the optical fiber from the optical preform, the alkali dopant is located at an interface 130 between the core rod (which, when drawn, becomes the fiber core) and the cladding jacket (which, when drawn, becomes the fiber cladding).

For embodiments in which K is the alkali dopant, potassium bromide (KBr) is deposited inside of an MCVD-deposited fluorine (F) doped trench and F-doped silica tube. KBr is deposited inside of an optical fiber jacket by heating an ampoule containing KBr and passing a carrier through the heated ampoule. For some embodiments oxygen ($O_2$) is used as the carrier while for other embodiments helium (He) is used as the carrier. Preferably, the ampoule contains between two grams (2 g) and ten grams (10 g) of KBr (e.g., approximately 5 g KBr) and is heated to a temperature of between 700 Celsius (C) and 1,000° C. (e.g., approximately 870° C.). The carrier ($O_2$ or He) is passed through the heated ampoule at a rate of between 100 standard cubic centimeters per minute (SCCM) and 800 SCCM (e.g., approximately 300 SCCM, approximately 500 SCCM, etc.). It should be appreciated that for a given ampoule temperature and tube dimension, the amount of KBr deposited on the inner surface of the cladding jacket is proportional to the $O_2$ or He carrier rate used for alkali delivery.

The K-deposited jacket is then used to over$_{clad}$ a Cl-doped core rod (with somewhere between approximately 3,000 parts-per-million (ppm) and 15,000 ppm Cl, preferably between 10,000 ppm and 12,000 ppm Cl). In the resulting K-doped preform, the K dopant is located outside of the Cl-doped core rod as shown by 130 in FIG. 1) but inside of the F-doped trench region. The K-doped preform is then drawn into an K-doped optical fiber, at which time K diffuses throughout the fiber core. Although K is chosen as the alkali in this embodiment, it should be appreciated that corresponding processes are applicable to other alkali dopants (e.g., Li, Na, Rb, Cs, or Fr) which are deposited using either alkali elements or the halides or oxides of these alkalis.

This process allows the alkali precursor or alkali oxide to be deposited at or near the core rod outer diameter at a radial position that is between approximately 90 percent (%) and 110% of the core rod diameter. Generally, once the alkali dopant is deposited between the core rod and the jacket (either by depositing the alkali dopant on the inner surface of the jacket or the outer surface of the core rod), the jacket is placed around the core rod and collapsed about the core rod to form the optical preform. Insofar as processes to collapse a jacket onto a core rod are known (e.g., rod-in-tube or other similar preform manufacturing processes), further discussions of such overcladding processes are omitted herein.

In an alternative process, the core rod is assembled inside a tube whose inner surface was previously deposited with an alkali dopant. Such a rod-and-tube assembly is not fully consolidated prior to fiber draw. During fiber draw, the tube with surface alkali dopant is fused with the core rod such that the alkali dopant diffuses into the fiber core and the tube cladding regions.

In yet another alternative, the core rod whose surface was deposited with alkali is assembled inside of a tube. Such a rod-and-tube assembly is not fully consolidated prior to fiber draw. During fiber draw, the tube is fused with the core rod with alkali surface dopant such that the alkali dopant diffuses into the fiber core and the tube cladding regions.

Because distribution of alkali throughout the core during fiber draw relies on a diffusion process, it is important to select an appropriate alkali with a known diffusion distance at a fiber draw temperature. Additionally, it is also important to control the chemical compositions of both the core and the cladding such that the selected alkali diffuses throughout the entire core. By providing higher rate of diffusion in the core and a slower rate of diffusion in the cladding, there is a greater likelihood of the alkali diffusing into the core than into the cladding.

Returning to FIG. 1, the chart shows that fiber stress profile 120 overlaid with the fiber profile 110 for an optical fiber that is drawn from an optical preform in which KBr is deposited at the outer diameter of the core rod (instead of the center of the core rod). The fiber axial stress profile is a proxy for the K-diffusion profile.

Despite the difference in initial KBr deposition location, the axial stress profile 120 (also designated as compressive stress profile or negative stress profile) in the core region is the same as optical fibers that are drawn from preforms in which the KBr is doped at the core center. Thus, the axial stress shown in FIG. 1 reveals that K diffuses from the core rod outer surface throughout the core region during fiber draw.

Figure 2:
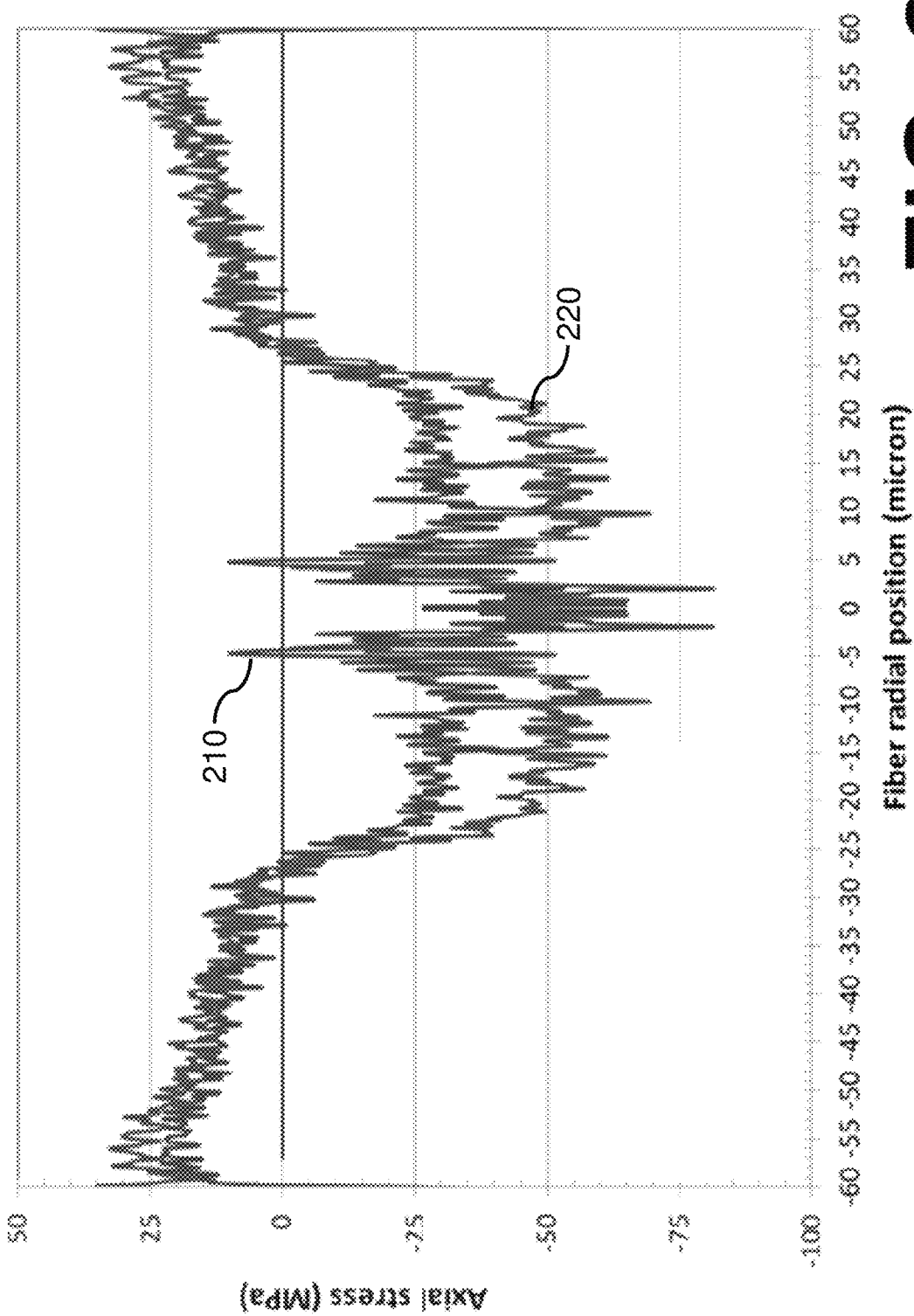
FIG. 2 is a chart comparing fiber axial stress profiles at forty gram (40 g) and seventy-five gram (75 g) draw tensions for one embodiment of an alkali-doped fiber with potassium bromide (KBr) doping at 300 standard cubic centimeters per minute (SCCM).

Turning now to FIG. 2, a chart comparing fiber axial stress profiles at forty gram (40 g) draw tension 210 and seventy-five gram (75 g) draw tension 220 is shown for KBr doping at 300 SCCM. In other words, FIG. 2 shows a comparison between an optical fiber that is drawn at 40 g tension and an optical fiber that is drawn at 75 g tension. Because of the difference in draw tensions (40 g compared to 75 g), there is also a corresponding temperature difference of approximately 65° C. Despite this lower draw temperature, FIG. 2 shows that the 75 g draw tension has a greater compressive stress on the core than the 40 g draw tension. The observation in FIG. 2 is consistent with 40 g draw tension and 75 g draw tension for fibers in which KBr is doped at the center of the core rod. In fibers drawn at these two tensions, the measured axial compressive stress is about 0.7 mega-pascals (MPa) for every gram of fiber draw tension; and, this ratio of fiber axial stress versus draw tension is consistent with those measured in fibers in which alkali doping was initiated at the preform core center.

Figure 3:
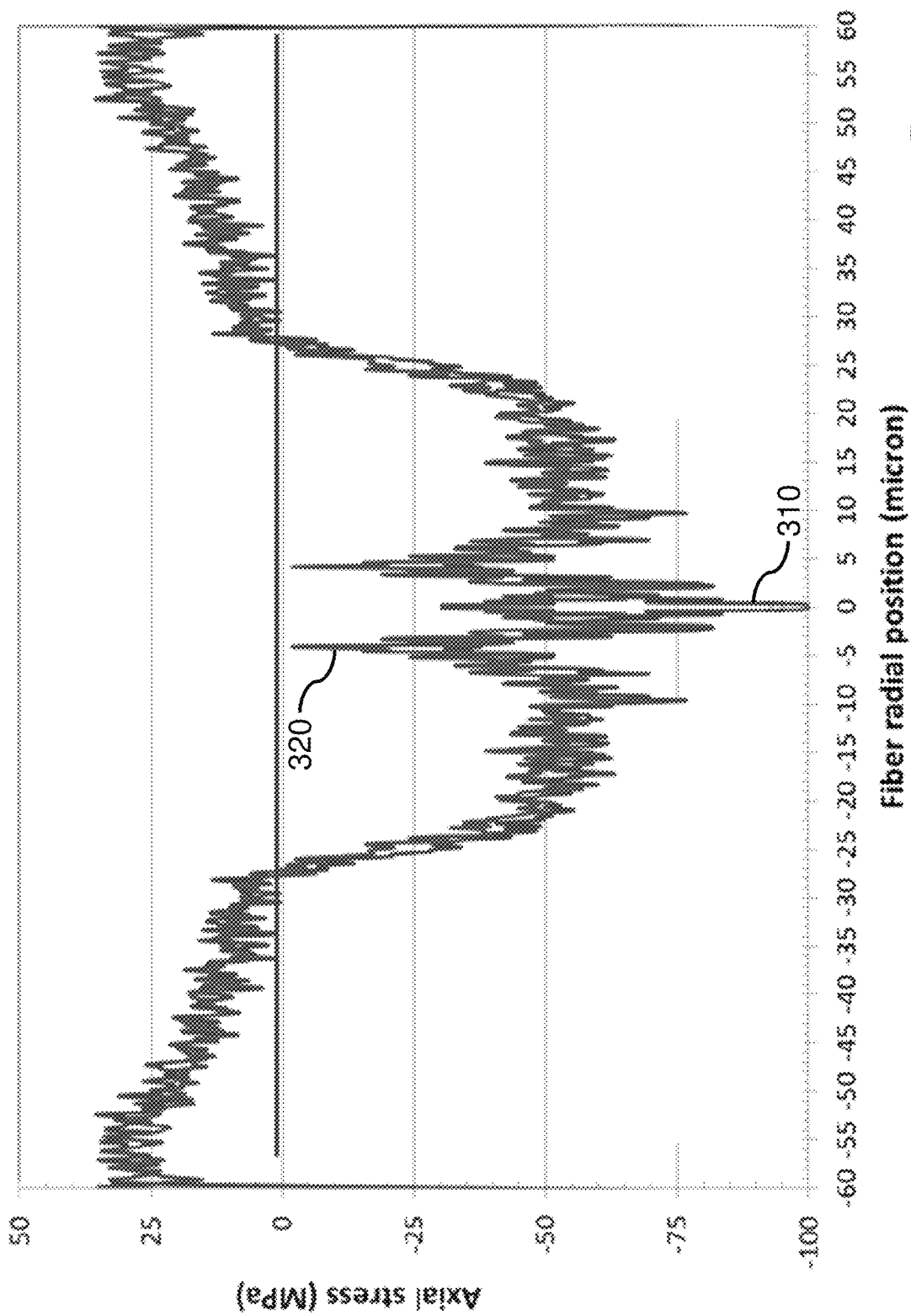
FIG. 3 is a chart comparing fiber axial stress profiles at 75 g draw tension for embodiments of alkali-doped fibers with KBr doping at 300 SCCM and 500 SCCM.

FIG. 3 is a chart comparing fiber stress profiles 310, 320 at 75 g draw tensions for embodiments of fibers drawn from alkali-doped preforms with KBr doping at two (2) different $O_2$ carrier rates, namely, 500 SCCM and 300 SCCM. As shown in FIG. 3, the 500 SCCM stress profile 310 when compared to the 300 SCCM stress profile shows that the core stress increases only slightly with a 200 SCCM higher $O_2$ carrier rate. In other words, even though the 500 SCCM is expected to deposit approximately 67% more KBr, the observation from FIG. 3 is that the KBr doping levels are adequate at both 300 SCCM and 500 SCCM for at least 83 mm-diameter optical preform estimated from the starting core rod diameter and the fiber core diameter.

Figure 4:
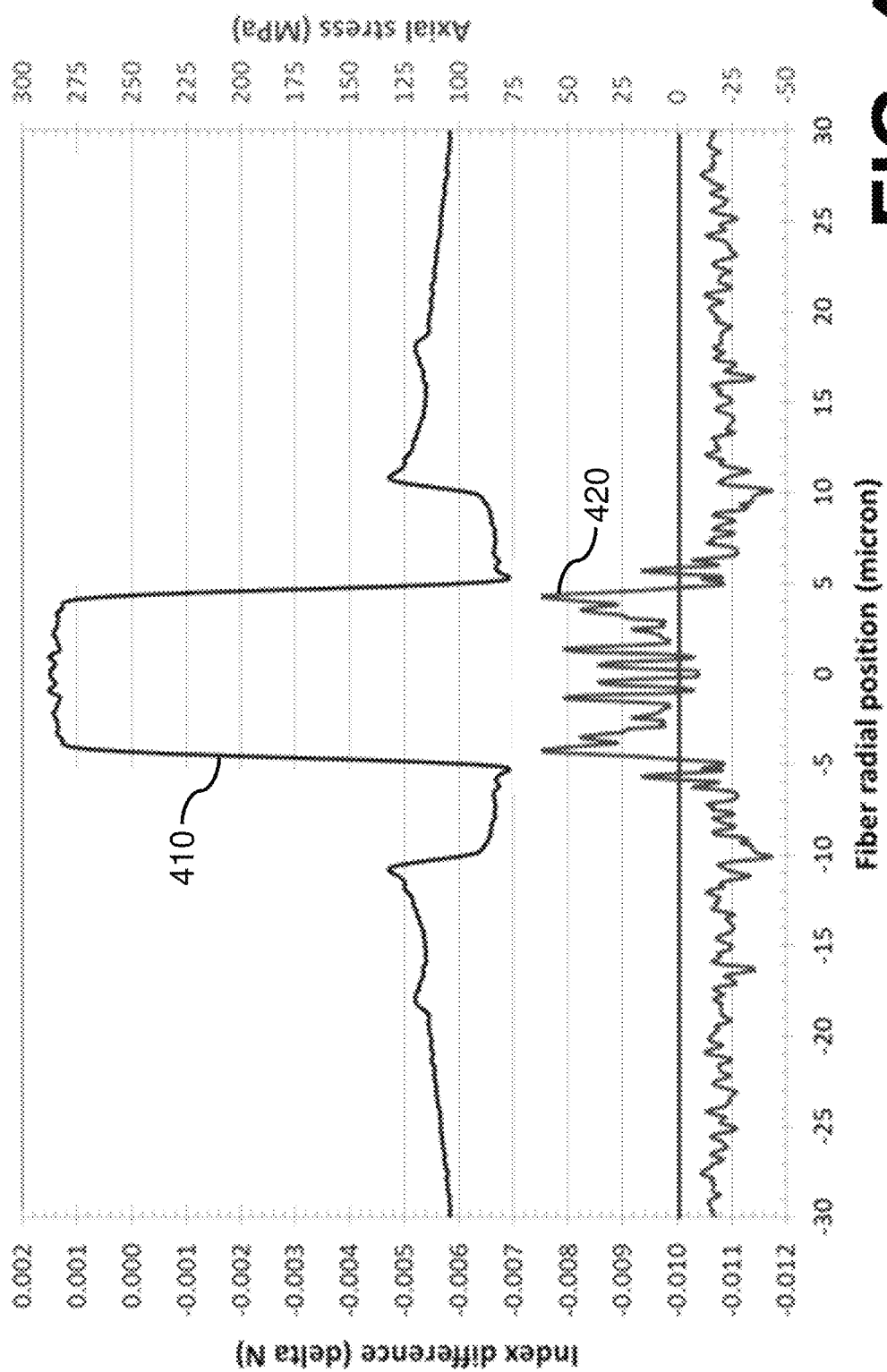
FIG. 4 is a chart showing one embodiment of a sodium chloride (NaCl) doped fiber profile with a corresponding fiber axial stress profile for the NaCl-doped fiber at 40 g draw tension.
Figure 5:
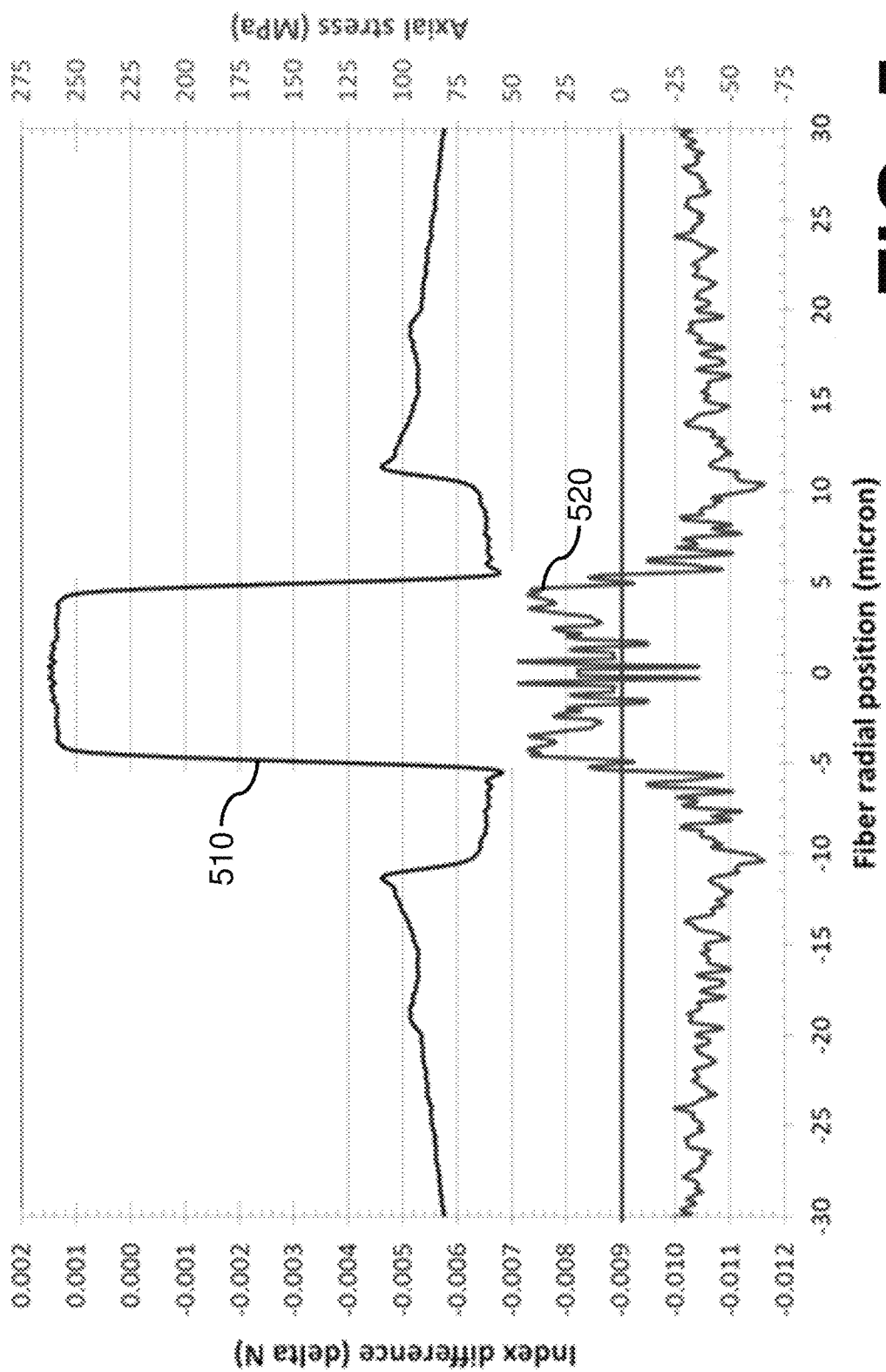
FIG. 5 is a chart showing one embodiment of a NaCl-doped fiber profile with a corresponding fiber axial stress profile for the NaCl-doped fiber at 75 g draw tension.

FIG. 4 is a chart showing one embodiment of a sodium chloride (NaCl) doped fiber profile 410 with a corresponding fiber stress profile at 40 g draw tension 420, while FIG. 5 is a chart showing another embodiment of a NaCl-doped fiber profile 510 with a corresponding fiber stress profile at 75 g draw tension 520. As shown in FIGS. 4 and 5, when NaCl is placed at the outer diameter of the core rod, little-to-no compressive stress is detected in the core region but, instead tensile (or positive) core stresses are observed. The core stresses (which translate to 25 megapascals (MPa) at 40 g draw tension and 20 MPa at 75 g draw tension) in NaCl-doped fiber are only slightly lower than 35 MPa in alkali-free Cl-doped core at 90 g draw tension. Thus, FIGS. 4 and 5 show that there is little-to-no preferential Na diffusion into the Cl-doped core relative to the F-doped trench. Na-induced vitrification is observed at the surface of the Cl-doped core rod outer surface upon core rod stretching, thereby indicating rapid Na diffusion during processing of the optical preform. The fast diffusivity rate of Na in silica results in diffusion of Na during the optical preform processing stages (rather than optical fiber drawing stages), thereby resulting in very little (if any) Na on the core rod surface during fiber draw.

Based on the information in FIGS. 4 and 5, it appears that an optimal diffusivity is required for successful alkali doping from the outside surface of the core rod. If the diffusion rate (or diffusivity) is too slow, then the entire core cannot be uniformly doped with the alkali dopant. Conversely, if the diffusivity is too fast (as shown by the Na-doping in FIGS. 4 and 5), then the alkali diffuses throughout the entire fiber (both core and cladding) without beneficial effects of preferential softening of the viscous core in matching viscosities between the core region and the cladding region.

Thus, to properly dope the entire core, the alkali diffusion distance at least equal to the radius of the fiber core ($r_{core}$). Because diffusion time is proportional to the square of the diffusion distance, most of the diffusion is expected to occur when the preform is drawn to nearly the final fiber diameter. Additionally, because the fiber axial stress profiles show that compressive stress extends to about four (4) times $r_{core}$, the diffusion distance is expected to be less than $4r_{core}$. Consequently, the required alkali diffusion distance is between $r_{core}$ and $4r_{core}$.

Because of this range of diffusion distances, a proper alkali dopant has a diffusivity (D), given in unit of $m^2/s$, is within the following range at fiber draw temperatures:

$$(r_{core}^2)(V/L) < D < (4r_{core})^2(V/L) \quad [\text{Eq. 1}],$$

or $$(r_{core}^2)(V/L) < D < 16(r_{core})^2(V/L) \quad [\text{Eq. 2}],$$

where V is a fiber draw speed in meters-per-second (m/s) and L is a length of a draw neck-down hot zone in millimeters (mm).

Figure 6:
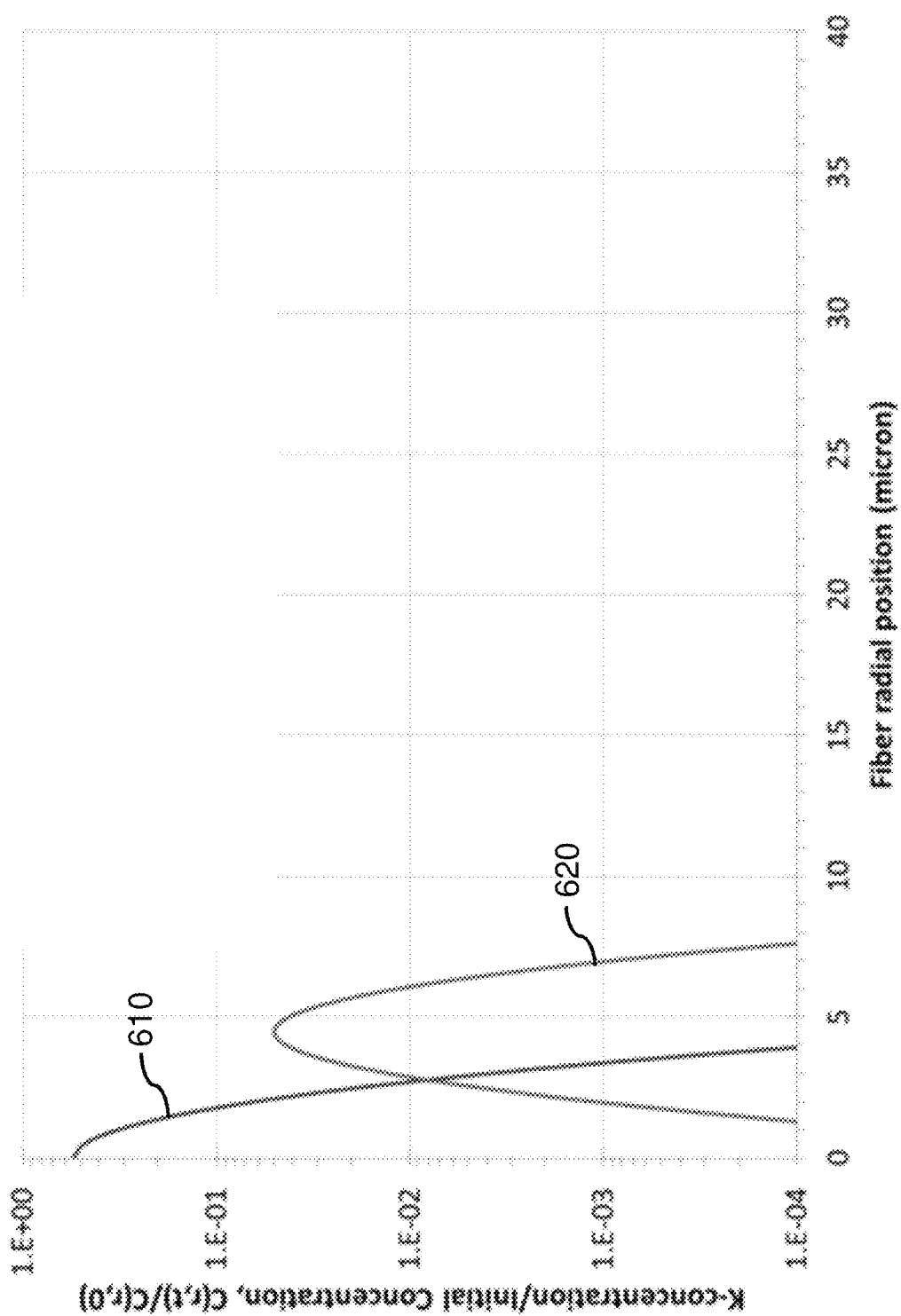
FIG. 6 is a chart comparing an alkali diffusion profile for an optical fiber in which a center of a core rod is doped (center-doped core rod) and an optical fiber in which an outer surface of a core rod is doped (surface-doped core rod) when doped with an alkali dopant having a normalized diffusivity of 0.0001.
Figure 7:
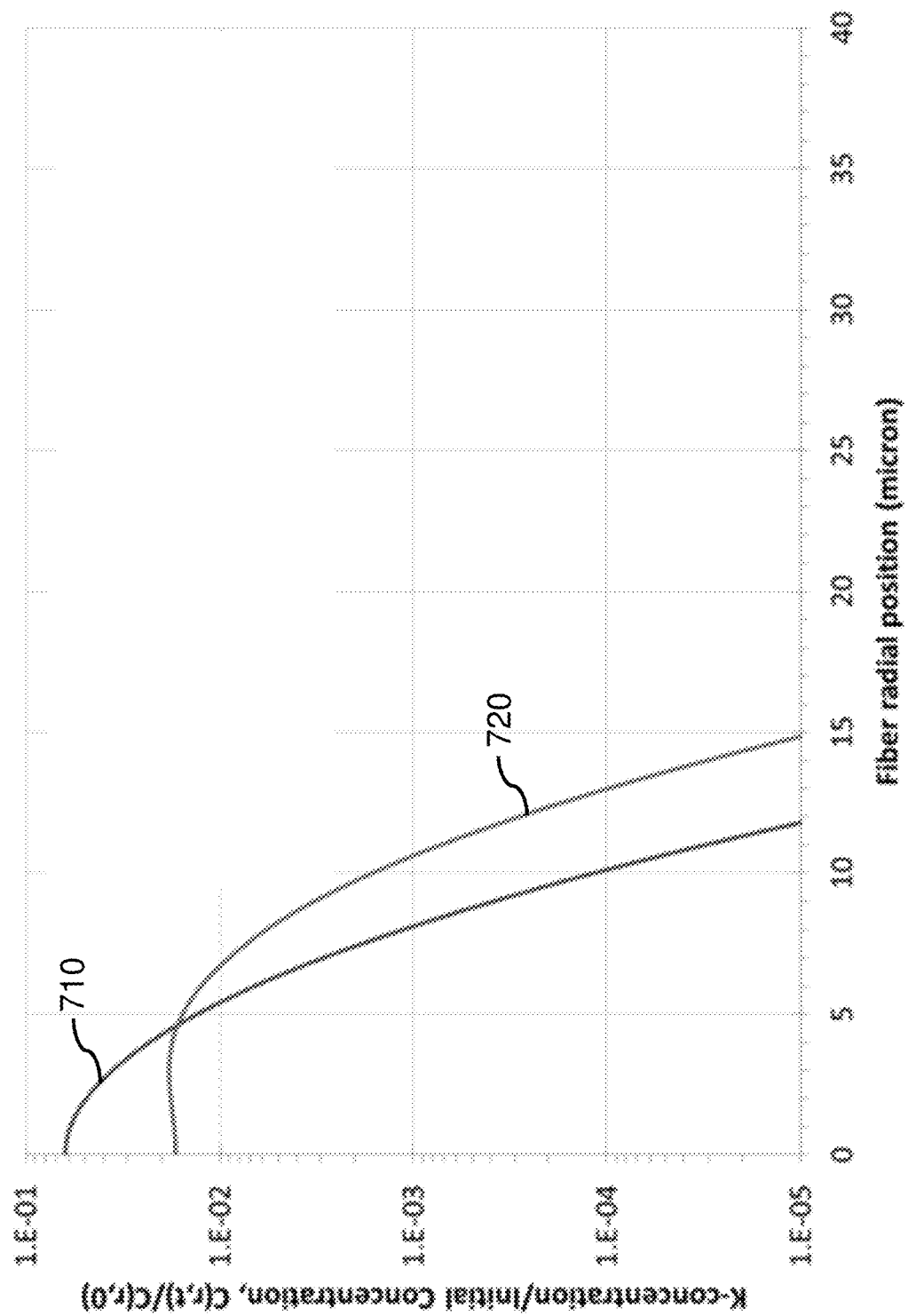
FIG. 7 is a chart comparing an alkali diffusion profile for a center-doped core rod and a surface-doped core rod when doped with an alkali dopant having a normalized diffusivity of 0.001.
Figure 8:
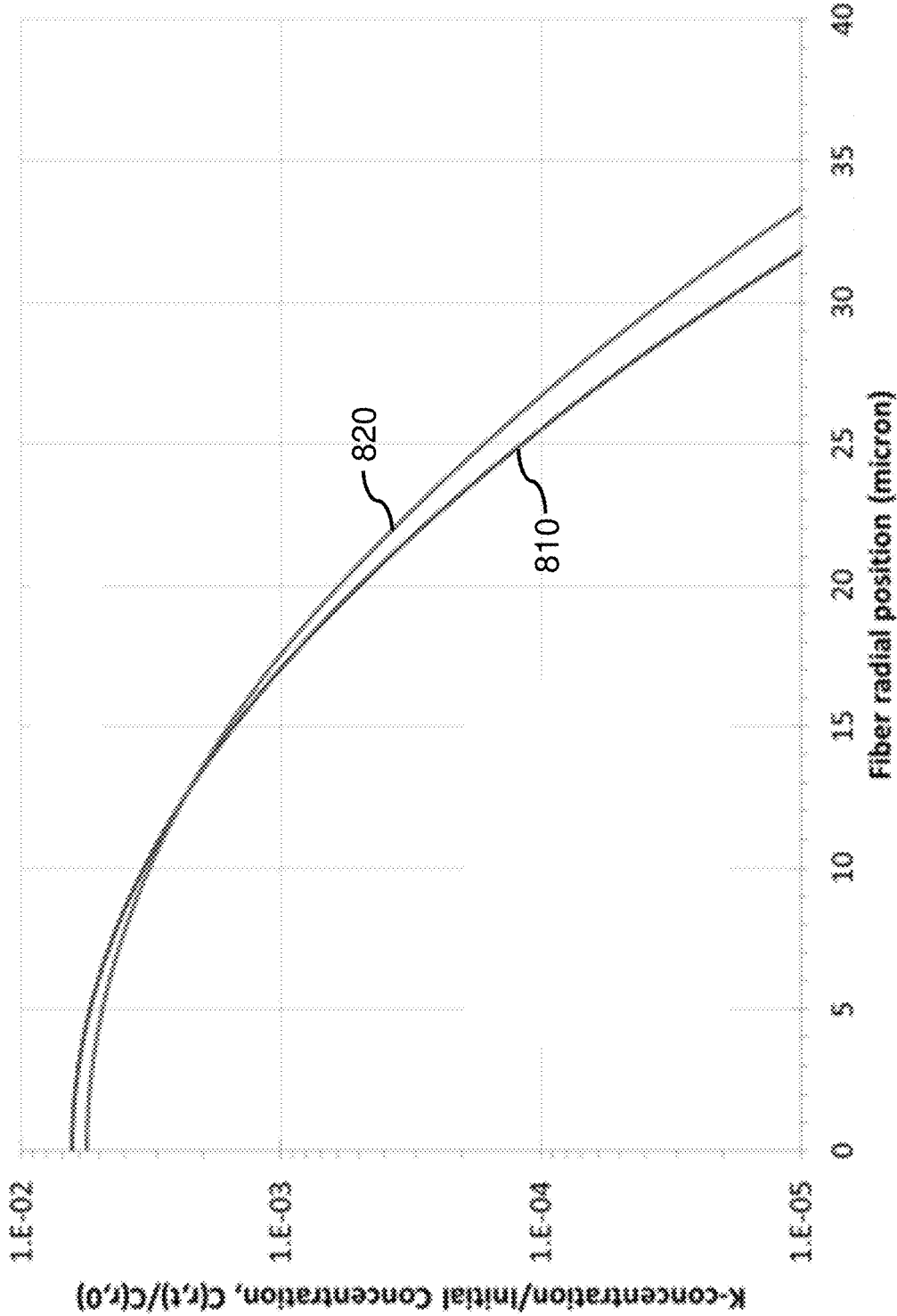
FIG. 8 is a chart comparing an alkali diffusion profile for a center-doped core rod and a surface-doped core rod when doped with an alkali dopant having a normalized diffusivity of 0.01.
Figure 9:
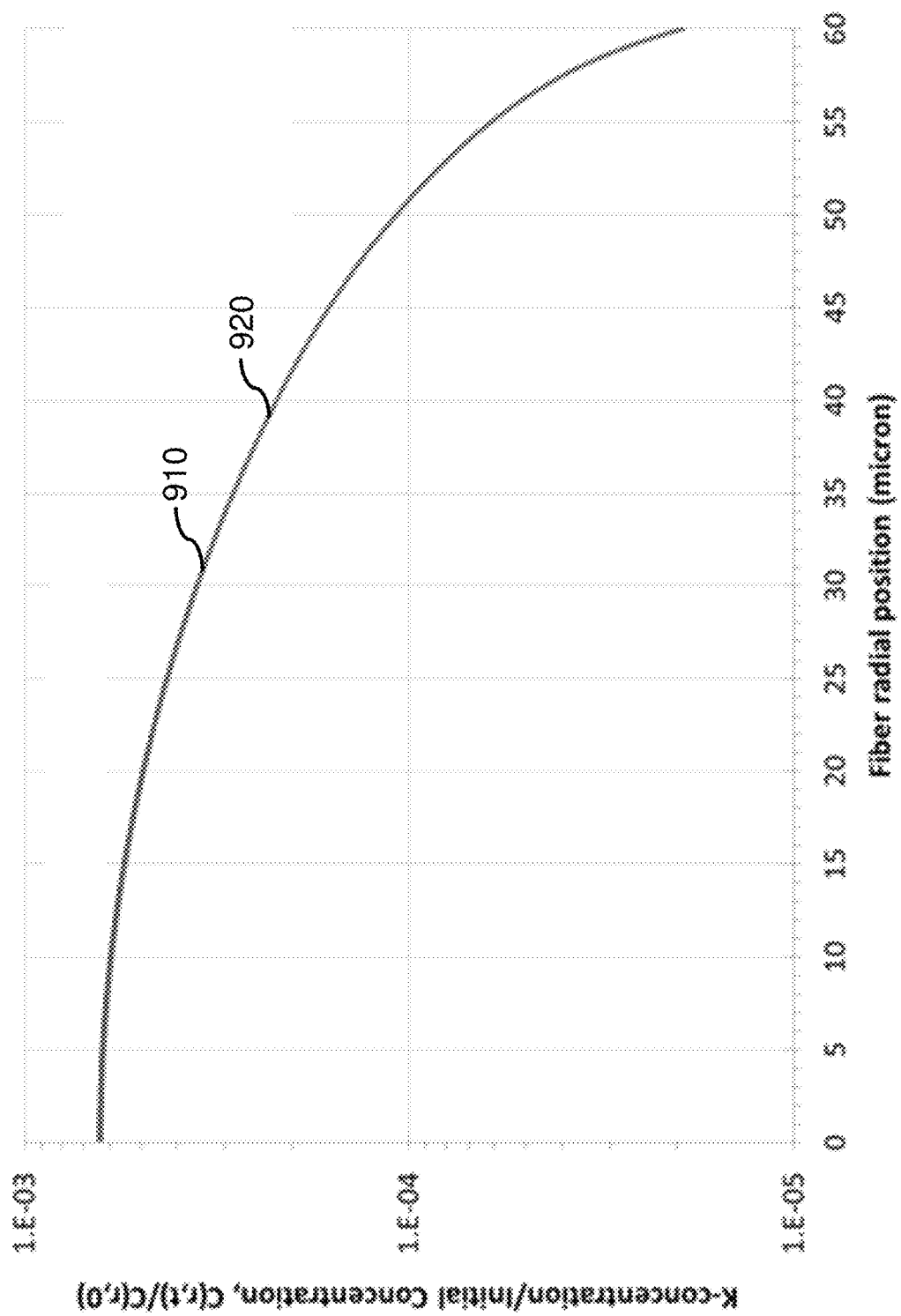
FIG. 9 is a chart comparing an alkali diffusion profile for a center-doped core rod and a surface-doped core rod when doped with an alkali dopant having a normalized diffusivity of 0.1.

Different alkali diffusion profiles 610, 620, 710, 720, 810, 820, 910, 920 are shown in FIGS. 6, 7, 8, and 9 for core rods that are drawn into 4.5 μm-core-radius and 62.5 μm-cladding-radius fibers (for both core rod center doping and for core rod surface doping). Specifically, FIG. 6 is a chart comparing an alkali diffusion profile for an optical fiber in which a center of a core rod is doped (center-doped core rod) 610 and an optical fiber in which an outer surface of a core rod is doped (surface-doped core rod) 620 when doped with an alkali dopant having a normalized diffusivity of 0.0001. Similarly, FIG. 7 compares alkali diffusion profiles for a center-doped core rod 710 and a surface-doped core rod 720 for a normalized diffusivity of 0.001; FIG. 8 compares alkali diffusion profiles for a center-doped core rod 810 and a surface-doped core rod 820 for a normalized diffusivity of 0.01; and, FIG. 9 compares alkali diffusion profiles for a center-doped core rod 910 and a surface-doped core rod 920 for a normalized diffusivity of 0.1.

In FIGS. 6 through 9, normalized diffusivity (D') is defined as $Dt/r_{clad}^2$, thereby making D' a dimensionless number. Also, the vertical axis shows alkali dopant concentration on a logarithmic scale, while the horizontal axis shows fiber radial position in μm. In FIGS. 6, 7, 8, and 9, the center-doped core rod dopant distribution profiles 610, 710, 810, 910 always show a maximum concentration at the core center for all fiber draw conditions of D' (namely, 0.0001, 0.001, 0.01, and 0.1). Unlike center-doped core rod distributions 610, 710, 810, 910, the surface-doped core rod distributions 620, 720, 820, 920 exhibit a different maximum dopant concentration at certain hot-zone exposure times. For example, at D'=0.0001, the maximum of the distribution 620 is very close to the location of the core surface (at 4.5 μm). As D' moves toward 0.001, the maximum shifts toward center, as shown in the distribution 720 of FIG. 7. At a sufficiently long diffusion time, represented by D'=0.1, there a near-perfect overlap between the center-doped core rod 910 and the surface-doped core rod 920. These different diffusion profiles 610, 620, 710, 720, 810, 820, 910, 920 reveal how the alkali-dopant was introduced into the core region.

Figure 10:
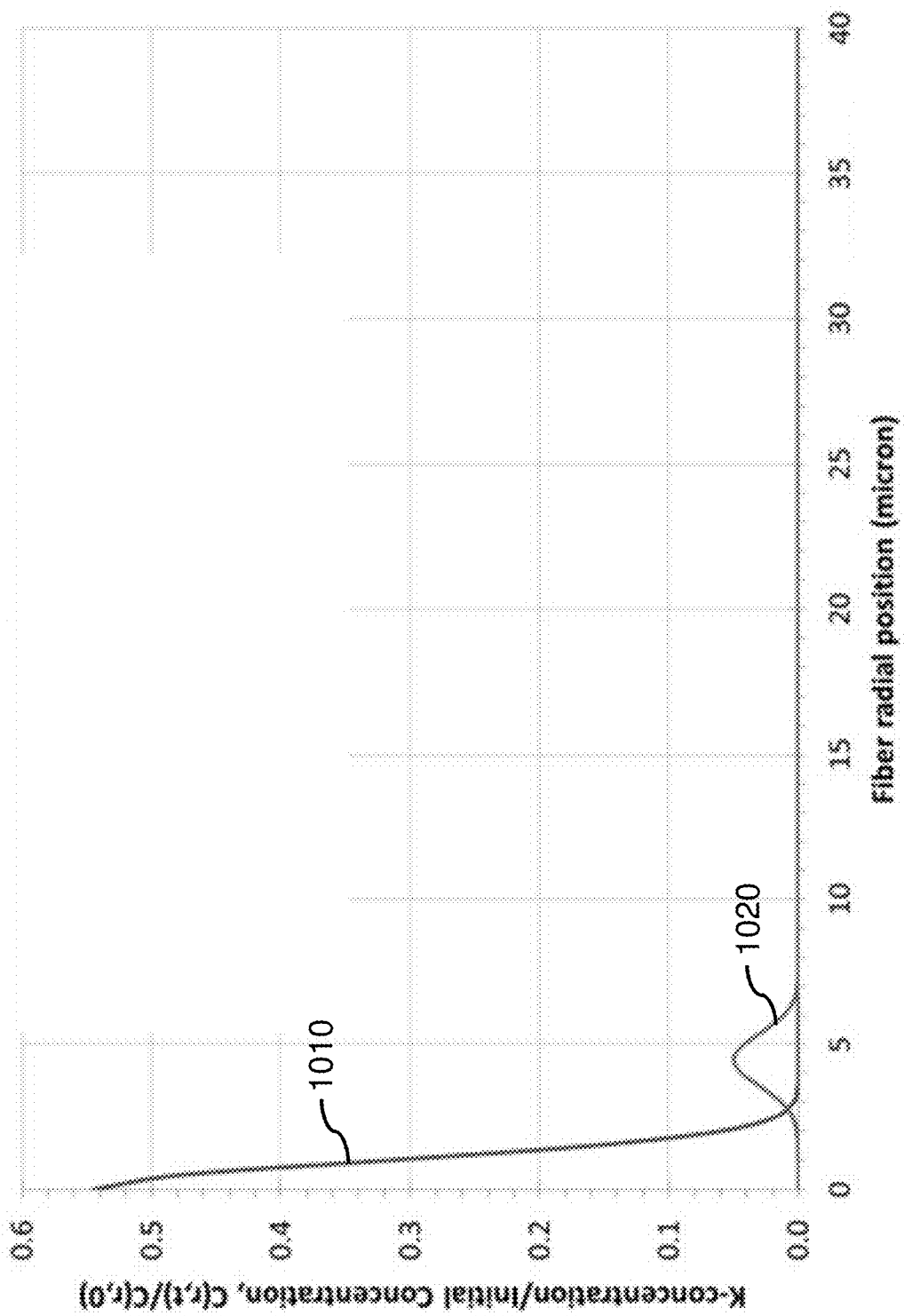
FIG. 10 is a chart comparing alkali dopant concentration between a center-doped core rod and a surface-doped core rod on a linear scale for a short diffusion time.
Figure 11:
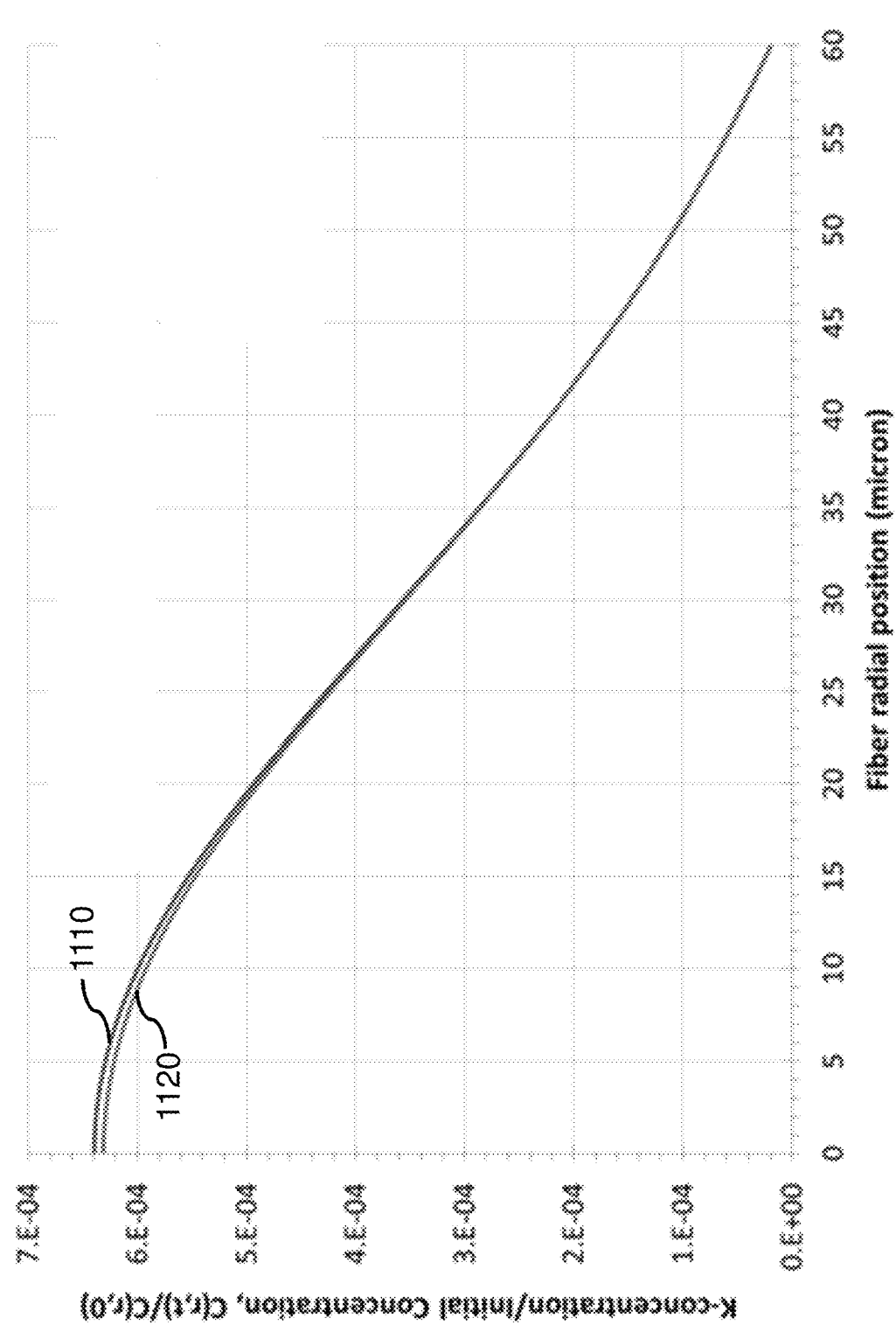
FIG. 11 is a chart comparing alkali dopant concentration between a center-doped core rod and a surface-doped core rod on a linear scale for a long diffusion time.

FIGS. 10 and 11 show alkali dopant concentrations on a linear scale after short and long diffusion times, respectively. Specifically, FIG. 10 compares alkali dopant concentrations between a center-doped core rod 1010 and a surface-doped core rod 1020 for a short diffusion time (D'=0.0001), while FIG. 11 compares alkali dopant concentration between a center-doped core rod 1110 and a surface-doped core rod 1120 on a linear scale for a long diffusion time (D'=0.1). As demonstrated by FIG. 10 (D'=0.0001), for the same total amount of alkali, a lower concentration is permitted when the alkali dopant is placed initially at a larger radial position. Despite substantially lower initial alkali concentrations 1010, 1020 (represented by D'=0.0001), nearly identical alkali distributions 1110, 1120 emerge after a sufficiently long diffusion time (represented by D'=0.1). Because a high alkali concentration incurs silica devitrification that potentially results in preform breakage and higher fiber attenuation due to scattering, alkali initial doping at a larger fiber radial position has an additional benefit of alleviating the potential devitrification problem.

With some experimental observations it is also possible to estimate the ratio of maximum concentration of an initial dopant deposit relative to a desired final concentration without incurring crystallization. Based on alkali-doping only at the center of the core rod, devitrification is visually observable near the center of the core rod at a critical doping condition, namely, when the amount of alkali doping was in excess of that deposited by six (6) doping passes at 700 SCCM of $O_2$ through a KBr ampoule that is heated at 870° C. If $C_a$ represents moles of KBr deposited per unit length inside of a substrate tube at the critical doping condition and the alkali-deposited region has a radius (m) of approximately 0.25 mm at the center of the core rod, then devitrification will occur when the alkali concentration exceeds a critical concentration level of:

$$C_a/[\pi r_D^2] \qquad [\text{Eq. 3}].$$

Unlike conventional center-doped core rods, the disclosed surface-doped core rods have the alkali deposited at a core outer radius, $r_{core}$. Using the same critical doping condition, the alkali concentrations in the disclosed embodiments will be:

$$C_a/[2\pi r_D r_{core}] \qquad [\text{Eq. 4}],$$

which means that the alkali concentration is reduced by a factor of $2r_{core}/r_D$ relative to that in the conventional center-doped core rods. Thus, for example, when $r_{core}=4$ mm the alkali concentration is reduced by a factor of 32, thereby substantially alleviating fiber devitrification caused by alkali doping.

Although many of the embodiments presume that the same diffusivity applies to both the core and the cladding, those skilled in the art understand that different co-dopants (e.g., Cl in the core and F in the adjacent cladding) affect alkali diffusivity in their respective co-doped regions. Thus, those skilled in the art appreciate that different chemical co-dopants can be selected to permit faster alkali diffusion in the core and slower alkali diffusion in the cladding. However, because alkali dopant requires a much longer diffusion distance in the cladding region than in the core region (because the diffusion distance in the cladding can be about four (4) times the diffusion distance in the core), the diffusivity of the core ($D_{core}$) can be sixteen (16) times smaller than the diffusivity of the cladding ($D_{clad}$) while maintaining similar D in both the core region and the cladding region.

As described in detail with reference to FIGS. 1 through 11, doping the core rod outer radius (rather than doping the center of the core rod) results in numerous advantages. Also, the disclosed embodiments in FIGS. 1 through 11 provide for greater efficiency in fiber draw by selecting an appropriate dopant (e.g., K) with an optimal diffusivity (D), using multiple dopants at different radial positions to improve diffusion (e.g., Na at the center of the core and K at the core-cladding (or core-trench) interface 130 (FIG. 1)), tailoring chemical compositions of the core and cladding (or trench) to control alkali diffusivity in these respective regions (e.g., higher diffusion in the core, lower diffusion in the cladding or trench), and using lower alkali concentrations to reduce devitrification problems.

For some embodiments, multiple jacket tubes are deployed such that an alkali dopant is deposited between the multiple jacket tubes. For example, an alkali dopant is deposited between the inner and outer jacket tubes to preferentially reduce the viscosity at the fiber outer radial regions. For a given alkali diffusion distance of $2\Delta R$ (e.g., between $R-\Delta R$ and $R+\Delta R$), the alkali-doped effective cross-sectional area (CSA) is represented as $CSA=4\pi R\Delta R$. This means that the alkali doped effective CSA increases with a larger fiber radial position, R.

For a given as-deposited alkali-dopant initial thickness, m, (same as that in Eq. (3) and Eq. (4)), the amount of as-deposited alkali-dopant per unit length is $2\pi Rr_D C_o$ at the fiber radial position, R, and $C_o$ is the deposited alkali concentration in units of mole/m³. After diffusion within a $2\Delta R$ diffusion distance, the average alkali concentration is $[2\pi Rr_D C_o]/[4\pi R\Delta R]=0.5r_D C_o/\Delta R$; and this average alkali concentration is independent of the fiber radial position, R. Since a larger CSA of the same alkali average concentration is doped at a larger radial position, a more effective viscosity reduction is achieved by doping at the fiber outer region than at the fiber inner region.

Different types of alkali dopants are deposited between different sets of jacket tubes to tailor the alkali radial distributions through their diffusion profiles. The choice of alkali type is based on its diffusivity, D, in silica at the fiber draw temperature. For a desirable diffusion distance, $\Delta R$, the desirable alkali should have diffusivity, D, that is close to $(\Delta R)^2(V/L)$ where V is the fiber draw speed and L is the fiber neck-down hot-zone length.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A manufacturing process for an optical preform, the optical preform for drawing an optical fiber therefrom, the optical fiber having a core radius ($r_{core}$), the optical fiber further having a cladding radius ($r_{clad}$), the manufacturing process for the optical preform comprising:

depositing potassium bromide (KBr) inside an optical fiber inner cladding jacket, wherein depositing the KBr comprises:

heating an ampoule containing between two grams (2 g) and ten grams (10 g) of KBr to a temperature of between 700° Celsius (C) and 1,000° C.; and passing a carrier through the heated ampoule at a rate of between 100 standard cubic centimeters per minute (SCCM) and 800 SCCM, the carrier being one selected from the group consisting of oxygen ($O_2$) and helium (He); and collapsing the inner cladding jacket about a chlorine (Cl) doped core rod, the Cl-doped core rod comprising between 3,000 parts-per-million (ppm) Cl and 15,000 ppm Cl.

2. The process of claim 1, wherein heating the ampoule comprises heating an ampoule containing approximately 5 g of KBr.

3. The process of claim 1, wherein heating the ampoule comprises heating the ampoule to a temperature of approximately 870° C.

4. The process of claim 1, wherein passing the carrier comprises passing the carrier at a rate of approximately 300 SCCM.

5. The process of claim 1, wherein passing the carrier comprises passing the carrier at a rate of approximately 500 SCCM.

6. The process of claim 1, wherein the core rod comprises between 10,000 ppm Cl and 12,000 ppm Cl.

* * * * *